US010240824B2

United States Patent
Zoetemeijer et al.

(10) Patent No.: US 10,240,824 B2
(45) Date of Patent: Mar. 26, 2019

(54) METHOD OF MONITORING AN AIR OPERATED HEAT EXCHANGER AND AN AIR OPERATED HEAT EXCHANGER

(71) Applicant: SHELL OIL COMPANY, Houston, TX (US)

(72) Inventors: Leendert Johannes Arie Zoetemeijer, Rijswijk (NL); Paul Kinghorn, Katy, TX (US); Paul Blackhurst, Amsterdam (NL); Willem Boevee, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 196 days.

(21) Appl. No.: 15/029,184

(22) PCT Filed: Oct. 13, 2014

(86) PCT No.: PCT/US2014/060231
§ 371 (c)(1),
(2) Date: Apr. 13, 2016

(87) PCT Pub. No.: WO2015/057547
PCT Pub. Date: Apr. 23, 2015

(65) Prior Publication Data
US 2016/0238288 A1    Aug. 18, 2016

Related U.S. Application Data

(60) Provisional application No. 61/891,081, filed on Oct. 15, 2013.

(30) Foreign Application Priority Data

Oct. 21, 2013    (EP) ..................................... 13189573

(51) Int. Cl.
*F25D 15/00*    (2006.01)
*F25B 39/00*    (2006.01)
(Continued)

(52) U.S. Cl.
CPC ................ *F25B 39/00* (2013.01); *F28B 1/06* (2013.01); *G01K 11/32* (2013.01); *G01K 13/02* (2013.01);
(Continued)

(58) Field of Classification Search
CPC ............ F25B 2313/031; F25B 2700/00; F25B 2313/111; F25B 2200/00; F28B 1/06;
(Continued)

(56) References Cited

U.S. PATENT DOCUMENTS

2010/0326133 A1* 12/2010 Beeby .................... F25J 1/0214
62/614
2013/0112392 A1* 5/2013 Karpinski ............... F28F 25/12
165/300

FOREIGN PATENT DOCUMENTS

DE    102007021565    11/2008
JP    10307067    * 11/1998

OTHER PUBLICATIONS

Machine translation JP10307067.*
(Continued)

*Primary Examiner* — Joseph Trpisovsky

(57) ABSTRACT

An air operated heat exchanger has a plurality of process tubes for process fluid, a plurality of rotating fans to move ambient air along an air stream path past the plurality of process tubes. At least one optical fiber is configured within the one or more air stream paths. At least one light pulse is passed into the at least one optical fiber, and at least one optical signal is detected from the at least one optical fiber in response to the at least one light pulse, to provide at least one signal profile. One or more air temperatures at a plurality of locations along the at least one optical fiber are determined from the at least one signal profile and evaluated against one or more comparison operational conditions.

15 Claims, 2 Drawing Sheets

(51) Int. Cl.
  *G01K 11/32* (2006.01)
  *G01K 13/02* (2006.01)
  *F28B 1/06* (2006.01)

(52) U.S. Cl.
  CPC .... *F28F 2200/00* (2013.01); *G01K 2013/024* (2013.01)

(58) Field of Classification Search
  CPC .... G01K 11/32; G01K 11/2306; G01K 13/02; G01K 2013/024
  USPC .................................................. 62/119, 129
  See application file for complete search history.

(56) References Cited

OTHER PUBLICATIONS

M. R. Ellmer, Ellmer, M.R., Fan pressure capability in the field versus design values presented at the Heat Exchange Engineering Asia Conference & Exhibition & HTRI Workshop 2007.
Jaaskelainen, M, Jaaskelainen, M., Systems Approach to Thermal Asset Monitoring using Advanced Distributed Temperature Sensing (DTS) Technology, Paper #30, Oil Sands and Heavy Oil Technology 2009, Jul. 2009, Calgary, Canada.

* cited by examiner

METHOD OF MONITORING AN AIR OPERATED HEAT EXCHANGER AND AN AIR OPERATED HEAT EXCHANGER

The present invention relates to a method of monitoring an air operated heat exchanger, and an air operated heat exchanger. The air operated heat exchanger is specially adapted for use in the method of monitoring according to the first aspect of the invention.

In the context of the present disclosure, the term "air operated heat exchanger" is used to refer to either an air-cooled heat exchanger (ACHE) or an air-heated heat exchanger (AHHE). Air operated heat exchangers utilise ambient air to add or remove heat to/from a process fluid by indirect heat exchange between the process fluid and an ambient air stream.

In an ACHE, the ambient air removes heat from a process fluid, which is at a higher temperature than the ambient air, to provide a cooled process fluid and warmed air. The ACHE has applications in gas processing and power industries, such as in gas import and export terminals, in the liquefaction of hydrocarbons such as natural gas, and in power generation. The process fluid may be a refrigerant such as a hydrocarbon or hydrocarbon mixture, or water, such as water vapour.

In an ACHE, the ambient air heats a process fluid, which is at a lower temperature than the ambient air, to provide a warmed process fluid and cooled air. The AHHE has application in gas import terminals in which cooled, particularly liquefied, hydrocarbons such as liquefied natural gas are gasified for supply to a gas distribution network.

In air operated heat exchangers, a plurality of rotating fans, typically axial fans, may be employed to move ambient air past process tubes containing the process fluid. The process fluid in the process tubes undergoes indirect heat exchange with the ambient air. In particular, in the case of an ACHE, the process fluid is cooled and the ambient air is heated. In order to enhance the heat exchange process, the surface area of the process tubes may be increased to improve heat transfer by the addition of thermally conductive fins, discs or other protuberances to the process tubes.

The paper titled "Fan pressure capability in the field versus design values" by M. R. Ellmer presented at the Heat Exchange Engineering Asia Conference & Exhibition & HTRI Workshop 2007 reviews those factors which may lead to low performance of air-cooled heat exchangers. Such factors are said to include inadequate design, corrosion, fouling, process mal-distribution, mechanical failure amongst others. In a number of case studies, the performance of air-cooled heat exchangers is measured by physical testing of individual fans in the field. These tests are said to involve determining airflow versus pressure and air face velocities across the fan blade. In addition, an assessment of environmental conditions which may influence performance of the air-cooled heat exchanger is also carried out.

One problem with such performance evaluation is the time and complexity of the analysis. Data must be collected on individual fans, for instance by measuring airflow with an anemometer. This requires the fans to be stopped when the temporary monitoring equipment is installed and removed. Similarly, it is also necessary to stop fan operation if the fan blade angle is to be determined. Furthermore, it is not always possible to test every fan in an ACHE, which may comprise tens, or hundreds of fans. Consequently, only a sample of the fans can be tested and assumptions must be made that the data acquired for those fans investigated is representative of the population of fans operating in the heat exchanger. In addition, such case studies only provide performance data at the time of the evaluation, and cannot monitor the air-cooled heat exchanger on an on-going basis.

In one aspect, the present invention provides a method of monitoring an air operated heat exchanger, said air operated heat exchanger comprising a plurality of process tubes for process fluid, a plurality of rotating fans to move ambient air along one or more air stream paths past the plurality of process tubes, wherein an optical fibre is configured within the one or more air stream paths, the method comprising at least the steps of:
  passing a light pulse into the optical fibre;
  detecting an optical signal from the optical fibre in response to the light pulse to provide a signal profile;
  determining from the signal profile one or more air temperatures at a plurality of locations along the optical fibre; and
  evaluating at least one of the one or more air temperatures from at least one of the plurality of locations against one or more comparison operational conditions.

In another aspect of the invention, there is provided an air operated heat exchanger comprising at least:
  a plurality of process tubes for process fluid;
  a plurality of rotating fans to move ambient air along one or more air stream paths past the plurality of process tubes;
  an optical sensing system comprising an optical fibre configured within the one or more air stream paths, and a measurement unit comprising an active light source, such as a laser, to pass a light pulse to the optical fibre, an optical receiver to detect an optical signal from the optical fibre in response to the light pulse to provide a signal profile, and a programmable computing device to determine from the signal profile one or more air temperatures at a plurality of locations along the optical fibre and evaluate at least one of the one or more air temperatures from at least one of the plurality of locations against one or more comparison operational conditions.

Any of the embodiments of the air operated heat exchanger according to the second aspect of the invention may employed in a method according to the first aspect of the invention, and vice versa, any of the embodiments disclosed for the method of monitoring the air operated heat exchanger may be used with the air operated heat exchanger according to the second aspect of the invention.

Embodiments of the present invention will now be described by way of example only and with reference to the accompanying non-limited drawings in which.

Figure 1:
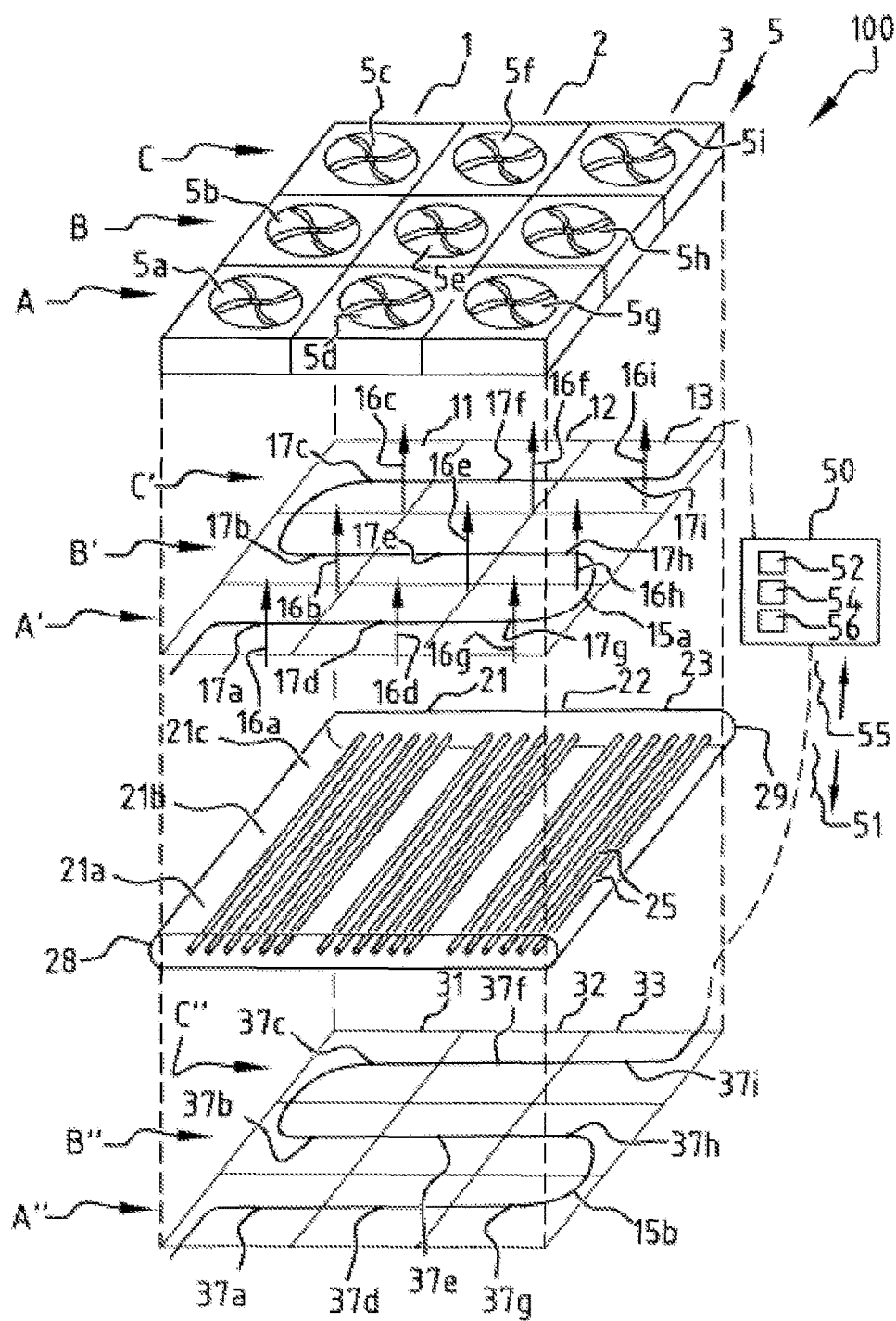
FIG. 1 is an expanded diagrammatic representation of one embodiment of the method and apparatus of the invention in an induced draft air-cooled heat exchanger.

The figures provide representations of air-cooled heat exchangers. However, the invention can be applied in an analog fashion in air-heated heat exchangers. Same reference numbers refer to similar components. The person skilled in the art will readily understand that, while the invention is illustrated making reference to one or more specific combinations of features and measures, many of those features and measures are functionally independent from other features and measures such that they can be equally or similarly applied independently in other embodiments or combinations.

A method of monitoring an air operated heat exchanger is proposed, which utilizes an optical fibre as a distributed sensor. The optical fibre is configured within one or more, preferably a plurality, of the air stream paths along which ambient air can be moved past the plurality of process tubes of the air operated heat exchanger by a plurality of rotating fans.

The optical fibre can be used to determine operational conditions of the heat exchanger at multiple locations along the length of the fibre from a single signal profile. This dispenses with the need to install and maintain distinct sensors at each desired location throughout the heat exchanger, which would be complicated and prohibitively expensive. Such operational conditions of the heat exchanger can be determined by determining air temperatures of the air as it is being moved along in the various one or more air stream paths. Air temperature may for instance be determined from a first location, the first location being before the ambient air is moved past the plurality of process tubes, and from a second location, the second location being after the air has been moved past the plurality of process tubes. Suitably, the one or more air temperatures either or both before and after the ambient air is moved past the process tubes is combined with information about air pressure and/or air velocity between the fan and process tubes. Such information may be determined with separate tools, which may or may not include optical fibres. It is also conceived that such information about air pressure and/or air velocity is determined using the same optical fibre as the one that is used for determining the temperature of the air.

The present method allows real time determination of operational conditions of the heat exchanger based on the air temperatures due to the fast speed of the optical data acquisition. The method allows the determined air temperatures to be evaluated against comparison operational conditions. This evaluation can be used to determine overall performance of the heat exchanger, or to monitor the operation of individual heat exchanger components, such as the rotating fans.

In particular, the method can be used to detect any sub-optimal operation of an air operated heat exchanger, or an array of air operated heat exchangers, or a component thereof, and/or to find the location where such sub-optimal operation originates if the cause of the sub-optimal operation is a localized condition.

Conditions external to the fibre, such as temperature, pressure or tensile forces can effect optical fibres, such as quartz glass fibres, and locally change the characteristics of light transmission in the fibre. In particular, external conditions can damp the transmission of light in the quartz glass fibres through scattering. Backscattered light can be detected at the same end of the optical fibre as the active light source.

The air operated heat exchanger may further comprise at least one fan motor to drive the plurality of rotating fans. Each of said plurality of rotating fans may move ambient air past a portion of the plurality of process tubes along an air stream path within the air operated heat exchanger, and at least a portion of the plurality of locations at which the one or more air temperatures are determined are situated in the air stream path, particularly upstream and downstream of the portion of the plurality of process tubes in the air stream path.

The terms upstream and downstream are defined by the direction along the air stream path of the flow of the ambient air within the air operated heat exchanger. In the locations upstream of the portion of the plurality of process tubes in the air stream path the air temperatures are determined of the ambient air before the ambient air has moved past the plurality of process tubes. In the locations downstream of the portion of the plurality of process tubes in the air stream path the air temperatures are determined in the air after it has moved past the plurality of process tubes. Each optical fibre is preferably configured within the one or more air stream paths within the air operated heat exchanger. This has advantages over measuring temperatures outside of the air operated heat exchanger as the temperature measurements will be less disturbed by outside wind.

Each of the rotating fans has a footprint defined by the air stream that is moved by said fan. Each footprint contains a portion of the plurality of process tubes. Preferably, for each rotating fan there is at least one location in the air stream path within the footprint of that rotating fan upstream of the portion of the plurality of process tubes that is in the footprint of said rotating fan, and at least one location in the air stream path within the footprint of that rotating fan downstream of the portion of the plurality of process tubes that is in the footprint of said rotating fan. The locations are preferably within the air operated heat exchanger and not outside the air operated heat exchanger. These locations correspond to the locations in which the air temperatures of the air as it is being moved along in the one or more air stream paths is determined.

When ambient air in an ambient air stream is moved past the plurality of process tubes, the ambient air stream heat exchanges with the process fluid in the process tubes. In this way, an air-cooled heat exchanger can cool a process fluid stream in the process tubes to provide a cooled process fluid stream. At the same time, the ambient air stream is heated to provide a warmed air stream. It will be apparent that the air will no longer be at ambient temperature after it has been moved past the plurality of process tubes because it will have heat exchanged against the process fluid in the plurality of process tubes.

Similarly, an air-heated heat exchanger can heat a process fluid stream in the process tubes to provide a heated process fluid stream. At the same time, the ambient air stream is cooled to provide a cooled air stream.

When the optical fibre is illuminated with an active light source, such as a laser, a short duration light pulse, such as a laser pulse, can be sent along the fibre and the backscattered light analysed. From the time it takes the backscattered light to return to a detector, it is possible to determine the location of the backscattering event and therefore the location along the fibre at which the external effect causing the backscattering occurred. Multiple events can be recorded along the length of the optical fibre as a continuous profile. Thus, the optical fibre functions as a distributed sensor, which may be a linear sensor.

Light scattering occurs in the optical fibre when light from the active light source, such as laser light, is passed along the length of the fibre. The scattered light may be emitted at the same wavelength as the light source (Rayleigh scattering) or at a different wavelength (Raman scattering). For instance, when the light interacts with the electrons in the optical fibre material, such as quartz, undergoing lattice oscillations caused by thermal excitations it undergoes a spectral shift by an amount equivalent to the resonance frequency of the lattice oscillation. Thus, the light scattered back from the optical fibre has three components, light with the wavelength of the light source (Rayleigh scattering), light shifted to longer wavelength than the light source (Stokes scattering) and light shifted to a shorter wavelength than the light source (anti-Stokes scattering). The intensity of the anti-Stokes scattering is temperature dependent, while the intensity of the Stokes scattering is essentially independent of temperature. The temperature at locations along the optical fibre can be derived from the ratio of the anti-Stokes and Stokes light intensities for backscattered light received at different times after the initial light pulse.

Alternatively, temperature at different locations along the optical fibre can be determined by Brillouin scattering. In this case, when light interacts with time-dependent optical density variations in the fibre, for instance lattice oscillations caused by thermal excitations, Stokes and anti-Stokes scattering changes the energy, and therefore frequency of the scattered light. The difference in the frequencies of the light pulse passed to the fibre and the scattered light (known as Brillouin shift) is a function of temperature.

With multiple light pulses, the frequency shift arising from temperature changes can be spatially resolved by the time resolved detection of the (back) scattered light for different frequency differences in combination with the transit time.

A further technique for the determination of temperature at different locations along an optical fibre utilises a Bragg grating. A Bragg grating is a short segment of optical fibre which reflects particular wavelengths of light having a mean wavelength known as the Bragg wavelength and transmits all other wavelengths. Bragg gratings may be achieved by a period variation in the refractive index of the fibre core. Multiple Bragg gratings may be provided in a single optical fibre. The Bragg wavelength of the reflected light depends on the effective refractive index of the grating and the grating period and is sensitive to temperature and strain. A measured shift in the Bragg wavelength can therefore be used as the basis for the distributed sensing of strain and temperature. In some circumstances, the detection of strain in the fibre can be used to determine the pressure exerted on the fibre, for example from an air stream.

As used herein, the term "signal profile" is intended to represent a data set describing an optical signal received from the optical fibre, optionally after optical filtering, in response to the light pulse. The data set may comprise the wavelength and intensity of the light forming the optical signal, together with its time of detection. In the present context, the signal profile may be a time-resolved backscattered optical signal, such that the time of detection can be measured from the time at which the light pulse is passed to the optical fibre.

As used herein, the term "the optical fibre is configured within the one or more air stream paths" means that at least a portion of an optical fibre is positioned in at least one of the one or more air stream paths. Consequently, the optical fibre does not have to be positioned within the air stream paths along the entire length of the fibre. Similarly, the optical fibre does not have to be positioned within the air stream paths along the entire length of the air stream paths. Further, the optical fibre does not have to be positioned within each and every air stream path. Thus, although not preferred, there may be air stream paths in which an optical fibre is not located. However, it will be apparent that the portions of the optical fibre which are positioned in one or more of the one or more air stream paths represent those locations at which the one or more air temperatures may be determined.

The step of passing the light pulse into the optical fibre may comprise passing multiple light pulses comprising a first light pulse and at least a second light pulse into the optical fibre. The step of detecting an optical signal from the optical fibre in response to the light pulse to provide the signal profile may comprise detecting multiple optical signals from the optical fibre, each of the multiple optical signals being detected in response to a different light pulse passed into the optical fibre, and each of the multiple optical signals providing one signal profile of a plurality of signal profiles.

The step of determining from the signal profile one or more air temperatures at a plurality of locations along the optical fibre may comprise determining from each of the plurality of signal profiles, one or more air temperatures at a plurality of locations along the optical fibre.

The light pulse may be applied at a frequency in the range of from, for example, once per hour to once per day. The frequency of the light pulse and subsequent analysis of the signal profile may vary. The timing of the light pulses, i.e. the times at which the light pulse or pulses are sent each day, may be varied seasonally.

In some circumstances, the optical signal can be used to determine one or more air temperatures, such as temperature, at a location to a resolution of approximately 1 m. Typically the air temperatures at each of the plurality of locations can be determined to an accuracy of 0.1° C. Suitable optical fibres may be quartz fibres of diameter approximately 2 micrometers. Optical fibres having a length of tens of kilometers may function as effective distributed temperature sensors.

The step of evaluating the one or more air temperatures at the plurality of locations against the one or more comparison operational conditions may be carried out for the one or more air temperatures at a plurality of locations determined from each of the plurality of signal profiles. In this way, it is possible to monitor the air operated heat exchanger over time in a time-lapse analysis. Consequently, the method of monitoring the air operated heat exchanger disclosed herein includes a method of continuously monitoring of the air operated heat exchanger.

The term "monitoring" should not be confused with or equated to "controlling". Monitoring is taking information from sensors (in the present case the optical fibre) and comparing the data with reference values, for instance stored values or values in corresponding reference locations, to warn and/or inform an operator of the status of the air operated heat exchanger. The operator may typically be warned and/or informed by, for instance, data reports, read outs, alarms, etc. Controlling, on the other hand, involves automatically sending control signals to devices to open/close, reduce/increase, activate/deactivate, manipulate. Hence when controlling, output from the system can affect next input.

For instance, pre-grant publication US 2013/0112392 discloses a method of temperature control of an air cooled heat exchanger with a tube bundle, wherein a discharge fluid temperature representing a temperature associated with a cooled process fluid product being discharged from the tube bundle is measured, and in response to the discharge fluid temperature falling to a first temperature, cooling of the tube bundle is reduced by reducing fan speed and in response to the discharge fluid temperature falling to a second temperature lower than the first temperature cooling of the tube bundle is further reduced by at least partially closing at least one of the air intake and the air exhaust. In addition, the disclosed ACHE is provided with two plenum temperature averaging resistance temperature detector (RTD) temperature sensors, each at one end of the tube bundle and located only on the upstream side of the tube bundle relative to the air stream, to measure the temperature of air proximate to the tube bundle. Plenum temperature readings are calculated as an average of the two temperature averaging RTDs. If one of these RTDs fails or is bypassed in response to a command, an averaging relay will automatically select the functioning RTD and use its direct readings. In response to the plenum chamber air temperature falling below a minimum plenum chamber air temperature threshold, heated air received from an air handling unit is caused to be injected into the air cooled heat exchanger to increase the air temperature in the plenum chamber of the air cooled heat exchanger.

In publication DE 10 2007 021 565 A1 it is proposed to replace electric thermometers that are disposed in coil wound heat exchangers with optical fibres.

The method and apparatus of monitoring the air operated heat exchanger disclosed in the present application may utilise an optical sensing system. The optical sensing system may comprise the optical fibre, and a measurement unit configured at one end of the optical fibre. The measurement unit may comprise an active light source, such as a laser source, an optical receiver and a programmable computing device. A single measurement unit may support multiple optical fibres, such as up to and including 8 optical fibres.

The optical receiver may comprise an optical filter, a signal processing unit and a directional coupler. The directional coupler can be placed between the active light source, the optical filter and the optical fibre, and operates to pass the light signal from the active light source to the optical fibre, and to pass the optical signal from the optical fibre to the optical filter of the measurement unit. The optical filter filters the optical signal whereby transforming the optical signal into a filtered optical signal. The optical filter may be arranged to block selected wavelengths or a selected range of wavelengths, and/or to separate stokes from anti-stokes components in the optical signal being passes from the optical fibre to the optical filter. The signal processing unit provides the signal profile from the filtered optical signal.

The step of evaluating the at least one of the one or more air temperatures from at least one of the plurality of locations against one or more comparison operational conditions may be carried out in the programmable computing device. The programmable computing device may comprise a micro-processor. The programmable computing device determines the one or more air temperatures at the plurality of locations from the signal profile. This can be achieved by applying an algorithm to signal profile. The programmable computing device is programmed to convert the signal profile into a data set comprising time, length and air temperature. The length is the distance along the fibre the air temperature was determined, and can be converted into a location in the ACHE. The data set can be uploaded and stored in a monitoring database.

The one or more air temperatures may be those in the one or more air stream paths. Typically the one or more air temperatures may include one or both of the air temperature before and after the air has moved past the plurality of process tubes. Other information may also be available, including information about air velocity, such as the air velocity between a rotating fan and a plurality of process tubes; and information about air pressure, such as air pressure before and after it is moved past the plurality of process tubes.

The step of determining from the signal profile one or more air temperatures at the plurality of locations along the optical fibre may be carried out in a programmable computing device, such as a micro-processor.

The step of evaluating at least one of the one or more air temperatures from at least one of the plurality of locations against one or more comparison operational conditions may be used to diagnose fouling, such as air-side fouling on the process tubes or a rotating fan, loss of air flow due to malfunction of the fan motor or fan or the transmission between the fan motor and fan, such as a belt drive or gearbox, hot air recirculation and maldistribution or blockages in the process tubes or in the ambient air moved past the process tubes as a stream.

Preferably, the comparison operational condition against which the at least one of the one or more air temperatures can be evaluated is ambient air temperature measured at another time and/or another location. In this context, ambient air temperature is measured locally within the air operated heat exchanger and within the air stream path at locations upstream of the portion of the plurality of process tubes.

The one or more comparison operational conditions may be from a different location or locations compared to the one or more air temperatures being evaluated. Thus, the one or more comparison operational conditions may be selected from one or more comparison air temperatures at the plurality of locations (along the optical fibre) determined from the signal profile having a different location or locations from the at least one of the one or more air temperatures being evaluated.

The one or more comparison operational conditions, particularly the one or more comparison air temperatures determined from the signal profile at a different location or locations to the at least one air temperature to be evaluated, are correlated with the at least one of the one or more air temperatures to be evaluated.

This correlation may be for instance, that the at least one of the one or more air temperatures being evaluated should be substantially the same as the one or more comparison air temperatures determined at different locations under standard operation of the air operated heat exchanger. As used herein, the term "standard operation" of the air operated heat exchanger is intended to represent operation of the air operated heat exchanger at its intended technical full-load sustained output i.e. nameplate capacity, without mechanical fault or other malfunction.

If upon evaluation, the at least one of the one or more air temperatures is found to be different from the one or more comparison air temperatures, maloperation of the air operated heat exchanger can be diagnosed.

Thus, the step of evaluating the at least one of the one or more air temperatures from at least one of the plurality of locations against one or more comparison air temperatures may comprise comparing the at least one of the one or more air temperatures from at least one of the plurality of locations against one or more comparison operational conditions, particularly one or more comparison air temperatures determined from the signal profile at a different location from that of the at least one of the one or more air temperatures being evaluated.

The step of evaluating may further comprise displaying the location of the at least one of the one or more air temperatures when it is different from the one or more comparison air temperatures.

The step of evaluating the at least one of the one or more air temperatures from at least one of the plurality of locations against one or more comparison operational conditions may be repeated. For instance, the evaluation step may be repeated for a different set of at least one of the one or more air temperatures from at least one of the plurality of locations and/or a different set of one or more comparison operational conditions. As used herein, the term "set" includes a set having only one member e.g. a single air temperature or comparison air temperature.

A portion of the plurality of locations at which the one or more air temperatures are determined from the signal profile are situated in equivalent locations in the air operated heat exchanger. Preferably, the equivalent locations exhibit substantially the same one or more air temperatures during standard operation of the air operated heat exchanger. Equivalent locations may relate to locations of substantially the same air temperatures as determined by a thermodynamic model of the operation of the air operated heat exchanger. The determination of equivalent locations in the air operated heat exchanger is considered to be within the ability of a skilled person.

The air operated heat exchanger may comprise a plurality of bays. Each bay may comprise a process fluid inlet header, a process fluid outlet header, a tube bundle comprising a plurality of process tubes, a plurality of rotating fans and a process fluid return header. Each bay typically further comprises a supporting frame for the components. A fan motor to drive the plurality of fans may also be provided. One or more fan motors may be dedicated to driving the set of fans in a particular bay, or the one or more fan motors may drive the fans from different bays. Typically each is provided with a distinct fan motor. The process tubes forming the tube bundle are in fluid connection with both the process fluid inlet and outlet headers.

Each process tube may comprise a first end and a second end. The first end of each process tube may be connected to the process fluid inlet header and the second end may be connected to a process fluid outlet header, such that the process fluid inlet and outlet headers are in fluid connection via the process tubes. In another embodiment, the plurality of process tubes may comprise a first set of process tubes and a second set of process tubes. The first set of process tubes may be connected at their first end to the process fluid inlet header, and at their second end to a process fluid return header, such that the process fluid inlet header and process fluid return header are in fluid communication. The second set of process tubes may be connected at their first end to the process fluid return header and at their second end to the process fluid outlet header, such that the process fluid return header and the process fluid outlet header are in fluid communication.

In one configuration, the first and second sets of process tubes may lie in the same plane as the process fluid inlet, outlet and return headers, such that the process fluid return header lies between the process fluid inlet and outlet headers in the same plane. In another configuration, the first and second sets of process tubes may lie gravitationally above and over or below and under one another. In such a configuration, the process fluid inlet and outlet headers may lie gravitationally above and over or below and under one another, such that the first and second sets of process tubes are arranged gravitationally above and over or below and under one another with the process fluid return header situated at the opposite end of the process tubes from the process fluid inlet and outlet headers. In this configuration, the process fluid in the second set of process tubes between the process fluid return header and process fluid outlet header would flow in a counter-current direction from the process fluid in the first set of process tubes between the process fluid inlet header and the process fluid return header.

In any of the aforesaid embodiments, a plurality of rotating fans, such as three fans, may be present in each bay to move ambient air past the plurality of process tubes. Each rotating fan may move ambient air past a different segment of the process tubes along an air stream path. For instance, when the bay comprises three fans, a first fan closest to the process fluid inlet header may move air along a first air stream path past a first segment of the process tubes closest to the process fluid inlet header, a second fan located on the opposite side of the first fan to the process fluid header may move air along a second air stream path past a second segment of the process tubes and a third fan, located closest to the process fluid outlet header and between the process fluid outlet header and the second fan may move air along a third air stream path past a third segment of the process tubes closest to the process fluid outlet header.

It is apparent that in an air-cooled heat exchanger, the process fluid travelling through the first, second and third segments of the process tubes will be sequentially cooled by the ambient air moved by the first, second and third fans in the first, second and third air streams respectively. Consequently, the process fluid in the second segment of process tubes will be cooler than the process fluid in the first segment. The process fluid in the third segment of process tubes will be cooler than the process fluid in the second segment.

The air operated heat exchanger may comprise a plurality of bays, for instance 12, 24, 36 or 48 bays. When each bay has the same configuration, air temperatures at a particular location in one bay would be expected to be identical with the same location in a different bay. For instance, the temperatures and air velocities above and below the first segment of the process tubes would be expected to be identical in each bay. Similarly, the temperatures and air velocities above and below the second segment of the process tubes would be expected to be identical in each bay etc. Thus, determination of one or more air temperatures at equivalent locations in the air operated heat exchanger allows the evaluation of the operational state, such as a functional or dysfunctional state, at each equivalent location by way of a comparison between the one or more air temperatures at each equivalent location.

Consequently, the one or more comparison air temperatures may be one or more air temperatures determined from the signal profile at an equivalent location to that of the at least one of the one or more air temperatures to be evaluated.

In alternative embodiments, the one or more comparison air temperatures may be one or more air temperatures determined during standard operation of the air operated heat exchanger.

Preferably, the one or more comparison air temperatures may be one or more optimal air temperatures for the air operated heat exchanger. Such optimal operating conditions could be stored in a reference database, with which the determined one or more air temperatures at each location are compared. The reference database may, for example store optimal operating conditions for one or more of different times of the day (including night-time), different mass flow rates of the process fluid, different process fluid temperatures (prior to entering the air operated heat exchanger) etc. Alternatively, the one or more optimal operating conditions may be calculated from a model of the operation of the air operated heat exchanger, particularly a dynamic mathematical model, for instance a dynamic thermodynamic model. Such models may take account of one or more of required duty for the air operated heat exchanger for the heat exchange with the process fluid, ambient air temperature, the temperature of the process fluid prior to entering the air operated heat exchanger, the mass flow rate of the process fluid, the temperature of the process fluid after heat exchange, the speed of the plurality of fans etc.

In the interest of clarity, reference will be made to air-cooled heat exchangers herein below. However, it is contemplated that the invention applies to both types of air operated heat exchangers in like fashion. The embodiments described in the following discussion relate to an air-cooled heat exchanger and the operation of an air-cooled heat exchanger. However, it will be apparent that the methods may likewise be applied to air-heated heat exchangers. The configuration of air-cooled heat exchangers and air-heated heat exchangers are known to the skilled person. Air-cooled heat exchangers may be forced draft ACHE, including recirculation forced draft ACHE; and induced draft ACHE.

In one embodiment, the air-cooled heat exchanger may be an induced draft air-cooled heat exchanger in which the plurality of rotating fans are positioned gravitationally above and over the plurality of process tubes.

Induced draft air-cooled heat exchangers can offer greater control of the process fluid through more efficient airflow distribution, particularly compared to forced draft air-cooled heat exchangers. In addition, the induced draft configuration provides additional protection to the process tubes by locating the plurality of rotating fans gravitationally above and over the plurality of process tubes. As used herein, the term "gravitationally above" means locating the plurality of rotating fans on a plane located further from the gravitational centre of (planetary) mass than the plane or planes on which the plurality of process tubes are located, and wherein the plurality of process tubes are located between the plurality of rotating fans and the gravitational centre of mass.

Typically, the at least one fan motor and any associated transmission such as belt drive or gearbox connecting the motor to the fan or fans is located gravitationally below and under the plurality of process tubes. Usually each rotating fan has a dedicated fan motor. As used herein, the term "gravitationally below" means locating the at least one fan motor and any associated transmission on a plane or planes nearer to the gravitational centre of mass than the plane or planes on which the plurality of process tubes are located, and wherein the at least one fan motor and any associated transmission are located between the plurality of process tubes and the gravitational centre of mass. Locating the at least one fan motor and any other associated mechanicals below the plurality of process tubes provides accessibility to the at least one fan motor and any associated mechanicals for maintenance.

Particularly in an induced draft air-cooled heat exchanger, the optical fibre may be one or both of: (i) located (gravitationally) below and under the plurality of process tubes in the one or more air stream paths, and (ii) located between the plurality of process tubes and the plurality of rotating fans in the one or more air stream paths.

The air operated heat exchanger may be a forced draft air operated heat exchanger, in which the plurality of rotating fans are positioned (gravitationally) below and under the plurality of process tubes.

Forced draft air operated heat exchangers can provide maintenance access to both the plurality of process tubes on the top of the heat exchanger and the one or more fans and optionally any associated transmission such as belt drive or gearbox on the bottom of the heat exchanger.

Particularly in a forced draft heat exchanger, the optical fibre may be one or both of: (i) located (gravitationally) above and over the plurality of process tubes in the one or more air stream paths, and (ii) located between the plurality of rotating fans and the plurality of process tubes in the one or more air stream paths.

The process fluid in the plurality of process tubes may be a refrigerant, such as a mixed hydrocarbon refrigerant comprising a mixture of hydrocarbon components.

The air operated heat exchanger may be an air-cooled heat exchanger in which the process fluid in the plurality of process tubes is a refrigerant and the method may further comprise:
  heat exchanging a refrigerant stream in the plurality of process tubes against ambient air to provide a cooled refrigerant stream;
  passing the cooled refrigerant stream to a product heat exchanger;
  indirectly heat exchanging the cooled refrigerant stream against a product stream, such as a natural gas stream, to provide a cooled product stream, such as a cooled natural gas stream.

As used herein, the term "indirectly" is intended to mean that there is no physical contact between or mixing of the refrigerant and product stream during the heat exchange.

In other embodiments, the process fluid in the plurality of process tubes may comprise water, such as cooling water comprising a corrosion inhibitor and a biological growth inhibitor, such as anti-fungal, anti-bacterial and/or anti-viral agent.

The one or more air temperatures may comprise both an ambient air temperature determined from a first location before the ambient air is moved past the plurality of process tubes and an air temperature determined from a second location after the ambient air has been moved past the plurality of process tubes. Air velocity and/or air pressure, measured at a location between the plurality of rotating fans and plurality of process tubes, may also be taken into consideration.

As already discussed, the comparison operation conditions may be standard operational conditions or calculated operational conditions from a model or determined operational conditions from equivalent locations in the heat exchanger.

Visualisation software, such as in 2-dimensions or 3-dimensions, may be provided to display the air temperatures and locations in the air operated heat exchanger. A data map can be created to attribute correlations between the air temperatures and locations to allow their evaluation against one or more comparison operational conditions.

One or more air temperatures at equivalent locations within the air operated heat exchanger would be expected to be the same. Thus, if upon comparison, one or more of the equivalent locations are found to exhibit air temperatures different from the determined air temperatures at other equivalent locations, then maloperation can be diagnosed in the evaluation step.

For instance, a lowered air velocity compared to that at other equivalent locations may be indicative of air-side fouling or fan problems, such as incorrect installation or problems with the transmission, such as a belt drive or gearbox, coupling a fan motor to a fan. Similarly, a lowered air velocity for a number of locations all having fans driven by the same fan motor, may be indicative of maloperation of the fan motor. In an ACHE this phenomenon may be accompanied by an increase in air temperature at a location downstream of the process tubes in the air stream moved past the process tubes, as compared to that in other equivalent locations.

Differences between various downstream air temperatures and/or differences of temperature differential within a single footprint between upstream and downstream air temperature in the footprints of different fans that are located at the same distance with respect to the process fluid inlet header (particularly in a different bay within the same air operated heat exchanger) may also be indicative of the fan not running or inadequate. A difference of, for instance, more than 1° C. could give warnings for inadequate air flow, while more than 3° C. could give warnings for a totally inoperative fan.

However, if a temperature differential is detected between the air temperature at a location downstream of the process tubes in the air stream moved past the process tubes, as compared to that in other equivalent locations, with similar air velocities at corresponding locations, this may be indicative of maldistribution of process fluid and/or a blockage inside the process tubes resulting in reduced mass flow of the process fluid and therefore decreased heat transfer with the ambient air during the heat exchange. Such scenarios may be caused by tube side fouling.

Figure 2:
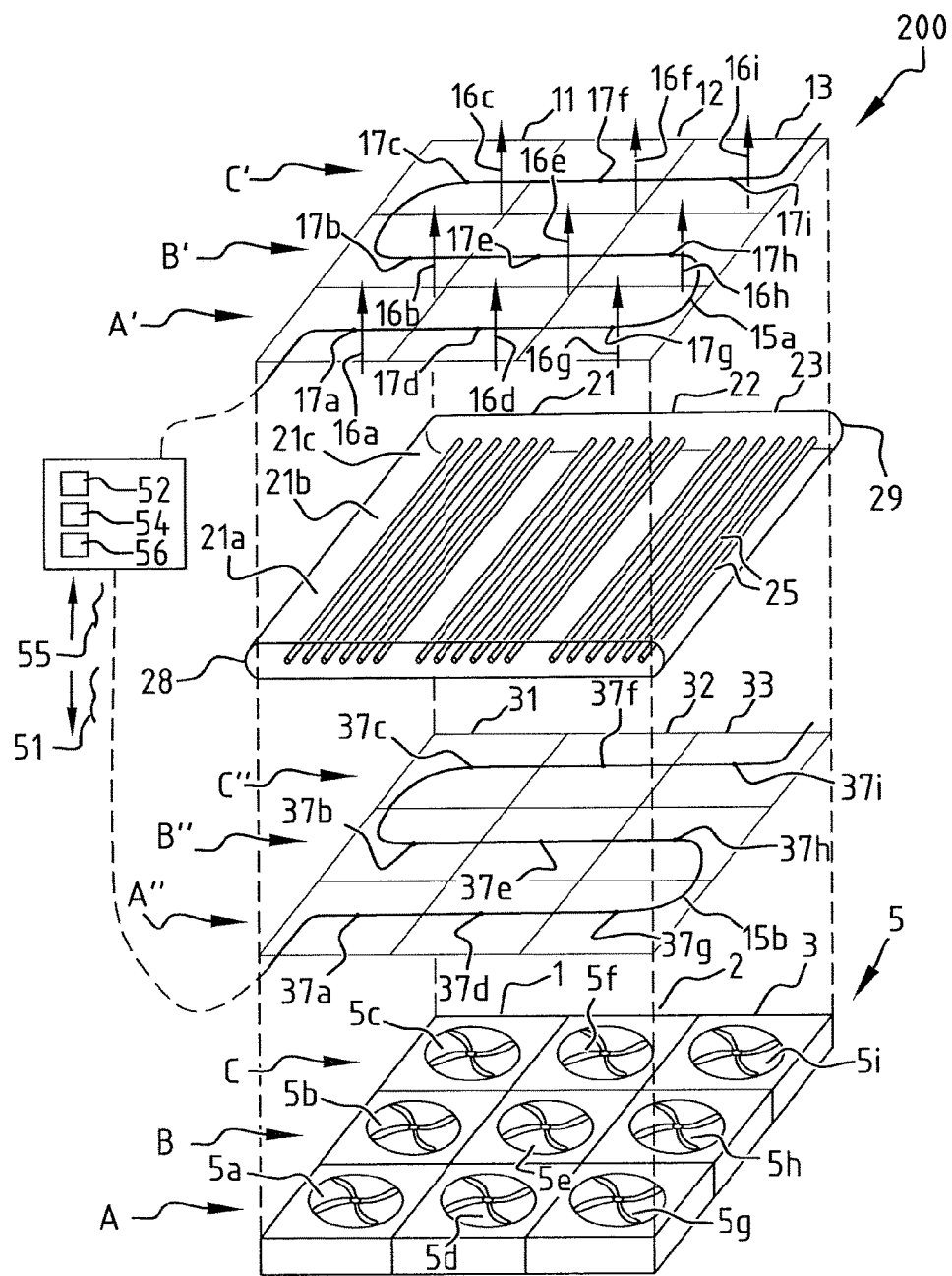
FIG. 2 is an expanded diagrammatic representation of one embodiment of the method and apparatus of the invention in a forced draft air-cooled heat exchanger.

FIGS. 1 and 2 disclose two ACHE configurations comprising optical fibre distributed sensing systems described herein. Both figures provide a schematic reference to the optical sensing system including two optical fibres 15a-b, configured within air stream paths 16a-i, and a measurement unit 50. The measurement unit 50 comprises an active light source 52 to pass at least one light pulse 51 to at least one optical fibre 15 and an optical receiver 54 to detect an optical signal 55 from the optical fibre 15b to provide a signal profile. The measurement unit 50 further comprises a programmable computing device 56, which is programmed to determine from the signal profile one or more air temperatures at a plurality of locations 37a-i along the optical fibre 15b, and to evaluate at least one of the one or more air temperatures from at least one of the plurality of locations against one or more comparison operational conditions.

FIG. 1 shows a schematic of an induced draft ACHE 100. In this configuration, a plurality of rotating fans 5 are provided gravitationally above and over a plurality of process tubes 25, to draw air upward along one or more air paths (16a to 16i) from below the heat exchanger past the process tubes. Optical fibre 15a, 15b, which may be a continuous optical fibre or separate optical fibres, is placed between the plurality of rotating fans 5 and plurality of process tubes 25 and also gravitationally below and under the plurality of process tubes 25. Optical fibre 15a, 15b may be secured, for instance, to the ACHE frame, such as the construction beams supporting process tubes 25.

Each process tube 25 is connected to a process fluid inlet header 28 at a first end from which each process tube is supplied with process fluid, such as a refrigerant, for instance a mixed hydrocarbon refrigerant. Each process tube 25 is connected to a process fluid outlet header 29 at a second end, to which each process tube supplies cooled process fluid after heat exchange with ambient air. Each process tube 25 may be provided with a plurality of thermally conductive protuberances such as fins on its external surface in order to increase the external surface area of the process tube and improve heat exchange with the air stream.

Locations 17a-i, 37a-i at which one or more air temperatures may be determined are shown on optical fibre 15a, 15b. The optical fibres 15a and 15b are preferably disposed in two layers, one layer in the air stream path upstream of the process tubes 25 to provide locations 37a-i, and one layer in the air stream path downstream of the process tubes 25 to provide the locations 17a-i. The layers are within the ACHE 100.

In the embodiment shown, locations 37a-i may measure the air temperatures of the ambient air prior to being drawn past process tubes 25 by rotating fans 5. These locations 37a-i may also be used to measure the velocity of the ambient air steam drawn towards the process tubes 25 by rotating fans 5. However, measuring the velocity of the ambient air stream at these locations is not preferred because the ambient air streams may be disturbed by wind movement underneath the ACHE 100.

Locations 17a-i may measure one or both of the air temperatures of the air after being drawn past process tubes 25 by rotating fans 5 and the velocity of the air stream drawn past the process tubes 25. Measuring air velocity at locations 17a-i is advantageous because the structure of the ACHE 100 will protect this area from wind disturbance, allowing a more reliable determination of the air stream velocity compared to locations 37a-i, which are exposed on the underside of the ACHE.

It will be apparent that locations 17a and 37a on optical fibre 15a and 15b respectively are placed in the footprint of fan 5a and therefore lie in the air stream moved by fan 5a past a first segment 21a of tube bundle 21. Similar locations 17b-i and 37b-i are shown for the other fans 5b-i. In this way, determination of one or more air temperatures at pairs of locations 17a-i and 37a-i can be correlated to monitor the operation of a particular rotating fan 5 and the cooling provided to the corresponding segment of the process tubes 25.

A two-dimensional map may be made of the air temperatures entering (upstream air temperature) and leaving (downstream air temperature) the air operated heat exchanger of all the respective air streams moved by the fans. This way even a space-resolved map may be made of the air temperatures upstream of the process tubes before the air stream has interacted with the process tubes. This allows for a comparison to be made of inlet air temperatures for the footprints of various fans, which reveals more information that merely relying on a generic single measurement of outside air temperature meaning the temperature of the environment surrounding the air operated heat exchanger. Under normal conditions, the inlet air temperatures in upstream locations should not differ much amongst the various footprints as ambient air is drawn in from the surrounding air around the air operated heat exchanger. However, hot air recirculation, for example, could be detected by comparing different upstream air temperatures for a plurality of the fan footprints. Differences of 1° C. or more between the upstream air temperatures in various footprints could give a warning for hot air recirculation. Alternatively, upstream air temperatures for a plurality of the fan footprints may be compared with a separate ambient air temperature sensor outside the air operated heat exchanger. Differences of 1° C. or more could give a warning for hot air recirculation.

Within the footprint of each fan a plurality of locations (for instance between 5 and 30 locations, such as 28 locations) may be provided each determining an air temperature. Suitably, the air temperatures determined by the plurality of locations within the footprint of a single fan is averaged thereby forming one temperature reading per fibre per footprint. However, variations of temperatures in the plurality of locations within a single footprint may also be indicative of blockages in the process tubes. For instance, local differences of more than 3° C. with the average temperature within the footprint may be indicative of a blockage in the portion of the process tubes within that footprint.

The footprint of each fan 5a-i around locations 17a-i, 37a-i is shown defined by a square grid. With regard to locations 17a-i, the grid comprises rows A', B' and C' and columns 11, 12, 13 such that grid square A', 11 defines the footprint of fan 5a around location 17a. Similarly, with regard to locations 37a-i, the grid comprises rows A", B" and C" and columns 31, 32 and 33, such that grid square A", 31 defines the footprint of fan 5a around location 37a.

In order to simplify the Figure, only a single location 17a-i or 37a-i is shown at the two different levels in the fan footprint of each fan 5a-i. It will be apparent that each location 17a-i, 37a-i may be a plurality of locations in each grid square at each level in a particular fan footprint. Providing more locations on each grid square at which air temperatures could be determined can be achieved, for instance, by introducing a more convoluted optical fibre path at each level. For example, if a single fan 5a has a cross-sectional area of 6 m×3 m, optical fibre may be laid at each level of this 18 m² footprint shown by grid squares A', 11 and A", 31 such that there is approximately 5-30 m of optical fibre in each fan footprint level. With a typical resolution of 1 m for the determination of temperature in an optical fibre, this means that temperature values may be determined at 5-30 locations in each fan footprint level, for the air stream moved by fan 5a, rather than only two locations 17a, 37a.

The induced draft ACHE 100 shown comprises three bays 1, 2, 3, with each bay having three fans 5 and a dedicated tube bundle 21, 22, 23 of process tubes 25. In each bay 1, 2, 3, the process fluid will pass along the process tubes 25 in respective tube bundles 21, 22, 23. Taking bay 1 as an example, tube bundle 21 can be divided into three segments 21a, 21b, and 21c. Each segment 21a, 21b, 21c is in the air stream of a different fan 5a, 5b, 5c respectively. The air temperatures of each air stream in the bay can be determined at pairs of locations 17a and 37a, 17b and 37b, 17c and 37c. Locations 37a, 37b and 37c can be used to determine the temperature of each ambient air stream and locations 17a, 17b and 17c can be used to determine the temperature and velocity of each warmed air stream after heat exchange.

Corresponding air temperatures can be determined from locations 37d, 37e, 37f and 17d, 17e and 17f in bay 2 of induced draft ACHE 100. Identically, corresponding air temperatures can be determined from location 37g, 37h, 37i and 17g, 17h, 17i in bay 3.

It is apparent that all three of the air streams moved by fans 5a, 5d and 5g would be expected to experience approximately the same air temperatures at corresponding locations. For instance, ambient air temperature measured at locations 37a, 37d and 37g (i.e. in row A") should all be approximately the same. Correspondingly, air stream temperatures and velocities measured at locations 17a, 17d and 17f (i.e. in row A') should all be similar. As a result of these correlations between the 3 locations in row A" and the correlations between the 3 locations in row A', air temperatures at equivalent locations can be compared and any deviation of an air temperature from those determined at equivalent locations would be indicative of maloperation. Thus, one or more air temperatures at one location can be evaluated by a comparison of the same air temperatures at an equivalent location to monitor the operation of ACHE 100.

For instance, a reduction in air velocity at location 17a compared to locations 17d and 17g, could be an indication of, for instance, fan malfunction, such as air side fouling of the fan or a mechanical defect in the fan 5a, its transmission or fan motor. If the same fan motor were to drive multiple fans, such as both of fans 5a and 5b, and no loss of air velocity is determined at location 17d in the air stream of fan 5b, then fan motor failure may be eliminated as the reason for maloperation, and only the transmission and fouling of fan 5a may be investigated.

In another example, a decrease in the temperature of the warmed air stream determined at locations 17a, 17b, 17c, compared to locations 17e, 17f, 17g respectively (and/or locations 17g, 17h, 17i respectively) would be an indication of air-side fouling of tube bundle 21 or maldistribution of the process fluid to tube bundle 21, such as a blockage in either the process tubes of this bundle or in the process fluid inlet or outlet header servicing this tube bundle, leading to a reduced mass flow of the process fluid through the process tubes.

As a further example, a decrease in the temperature of the air stream determined at location 17b, compared to locations 17e and 17h would be an indication of air side fouling of the process tubes in tube bundle 21. If the temperature determined at location 17a does not deviate from that at locations 17d and 17g then possible maloperation at segment 21a, or blockage of the process fluid to the tube bundle can be eliminated and the problem isolated to the air side of segment 21b of the tube bundle.

It will be apparent to the skilled person that many other correlations can be used in the evaluation of one or more process conditions at different locations in order to monitor the operation of the ACHE.

FIG. 2 is a schematic of a forced draft air-cooled heat exchanger 200. In this configuration, a plurality of rotating fans 5 are provided gravitationally below and underneath a plurality of process tubes 25, to push air upward from below the rotating fans past the process tubes. Components having the same reference number as the induced draft ACHE of FIG. 1 have the same meaning and function in the forced draft ACHE of FIG. 2.

In a similar manner to the embodiment of FIG. 1, optical fibre 15a, 15b, which may be a continuous optical fibre or separate optical fibres, is placed between the plurality of rotating fans 5 and plurality of process tubes 25 and also gravitationally above and over the plurality of process tubes 25. Optical fibre 15a, 15b may be secured, for instance, to the ACHE frame, such as the construction beams supporting process tubes 25.

The optical fibre 15a, 15b acts as a distributed sensor, along which one or more air temperatures may be determined as discussed above.

Preferably, optical fibre 15b can be used to determine one or more air temperatures selected from one or both of the temperature of the ambient air i.e. the temperature (within the air operated heat exchanger) of the ambient air stream before it passes the plurality of process tubes 25. Information may also be determined about the velocity of the ambient air stream before it passes the plurality of process tubes 25 at locations 37a-i. Optical fibre 15a can be used to determine one or both of the temperature of the air after it has passed the plurality of process tubes 25 and the velocity of the air stream after it has passed the plurality of process tubes 25 at locations a-i.

In contrast to the embodiment of FIG. 1, it is preferred that the air stream velocity is determined in locations close to optical fibre 15b, rather than 15a. This is because optical fibre 15b is situated between the rotating fans 5 and the plurality of process tubes 25 and will therefore be more protected from wind disturbance compared to optical fibre 15a, which is situated above the plurality of process tubes 25.

Apart from this difference, the operation of the monitoring method is identical to that of FIG. 1, and similar correlations between the air temperatures at different locations will apply.

The ACHE disclosed herein, particularly those according to FIGS. 1 and 2, may be used cool a refrigerant, such as a pre-cooling refrigerant, in the liquefaction of natural gas. The pre-cooling refrigerant may be a hydrocarbon or a mixture of hydrocarbons.

The method of monitoring the ACHE and the corresponding apparatus can be used to detect the maloperation of the ACHE, and to isolate the area of maloperation. This may allow repairs and/or maintenance to be directed towards specific locations within the ACHE, such as particular bays within the ACHE or even particular components of a bay, such as fans, belt drives or fan motors. This is advantageous, because it may be possible to isolate and repair the malfunction at the specific location, without having to shut down the operation of the entire ACHE. Instead, it may only be necessary to shut down the particular malfunctioning component, or the bay containing the malfunctioning component. This can lead to an increase in the performance of the ACHE. To place this in context, in the liquefaction of natural gas a production increase of 0.7% is expected for a 1° C. improvement in cooling from the ACHE.

The person skilled in the art will understand that the present invention can be carried out in many various ways without departing from the scope of the appended claims.

The invention claimed is:

1. A method of monitoring an air operated heat exchanger, said air operated heat exchanger comprising:
 a plurality of process tubes for process fluid,
 a plurality of rotating fans to move ambient air along one or more air stream paths past the plurality of process tubes, each of the plurality of rotating fans corresponding to a segment of the plurality of process tubes, and
 at least two optical fibres configured within the one or more air stream paths, the at least two optical fibres comprising a first optical fibre located in a first layer in the air stream path downstream of the process tubes and a second optical fibre located in a second layer in the air stream path upstream of the process tubes, the first layer and the second layer being within the air operated heat exchanger, the method comprising the steps of:
 passing a light pulse into at least one of the two optical fibres;
 detecting an optical signal from the at least one of the two optical fibres in response to the light pulse, to provide a signal profile;
 determining from the signal profile air temperatures of the air as it is being moved along in the one or more air stream paths, at pairs of locations along the at least one of the two optical fibres;
 correlating said air temperatures to monitor the operation of at least one of the plurality of rotating fans and the cooling provided to the corresponding segment of the plurality of process tubes; and
 evaluating at least one of the air temperatures from at least one of the pairs of locations against one or more comparison operational conditions.

2. The method of claim 1, wherein one of the first optical fibre and the second optical fibre being located between the plurality of process tubes and the plurality of rotating fans and the method further comprises the step of measuring air velocity at locations along the one of the first optical fibre and the second optical fibre located between the plurality of process tubes and the plurality of rotating fans.

3. The method of claim 1, comprising the step of making a two-dimensional map of the air temperatures entering and leaving the air operated heat exchanger of the one or more air streams.

4. The method of claim 1, wherein a subset of the pairs of locations at which one or more air temperatures are determined from the signal profile is situated in equivalent locations in the air operated heat exchanger.

5. The method of claim 4, wherein said equivalent locations exhibit substantially the same one or more comparison operational conditions during standard operation of the air operated heat exchanger.

6. The method of claim 4, wherein the one or more comparison temperatures are one or more air temperatures determined from the signal profile at an equivalent location to that of the at least one of the one or more air temperatures being evaluated.

7. The method of claim 1, wherein the one or more comparison temperatures are one or more optimal temperatures for the air operated heat exchanger.

8. The method of claim 7, wherein the one or more optimal temperatures are calculated from a model of the required duty for the air operated heat exchanger for the heat exchange of the process fluid.

9. The method of claim 1, wherein the air operated heat exchanger is an induced draft air-cooled heat exchanger in which the plurality of rotating fans is positioned gravitationally above the plurality of process tubes.

10. The method of claim 9, wherein the second optical fibre is located gravitationally below the plurality of process tubes in the one or more air stream paths, and the first optical fibre is located between the plurality of process tubes and the plurality of rotating fans in the one or more air stream paths.

11. The method of claim 1, wherein the air operated heat exchanger is a forced draft air-cooled heat exchanger in which the plurality of rotating fans is positioned gravitationally below the plurality of process tubes.

12. The method of claim 11, wherein the first optical fibre is located gravitationally above the plurality of process tubes in the one or more air stream paths, and the second optical fibre is located between the plurality of rotating fans and the plurality of process tubes in the one or more air stream paths.

13. The method of claim 1, wherein the air operated heat exchanger is an air-cooled heat exchanger and the process fluid in the plurality of process tubes is a refrigerant, said method further comprising the step of: using the air-cooled heat exchanger to cool the refrigerant in the liquefaction of natural gas.

14. The method as in any one of the preceding claims, wherein the one or more operational conditions are ambient air temperature determined from a first location before the ambient air is moved past the plurality of process tubes and an air temperature determined from a second location after the air has been moved past the plurality of process tubes.

15. An air operated heat exchanger comprising:
 a plurality of process tubes for process fluid;
 a plurality of rotating fans to move ambient air along one or more air stream paths past the plurality of process tubes, each of the plurality of rotating fans corresponding to a segment of the plurality of process tubes;
 an optical sensing system comprising at least two optical fibres configured within the one or more air stream paths, the at least two optical fibres comprising a first optical fibre located in a first layer in the air stream path downstream of the process tubes and a second optical fibre located in a second layer in the air stream path upstream of the process tubes, the first layer and the second layer being within the air operated heat exchanger, and a measurement unit comprising an active light source to pass at least one light pulse to the at least one of the two optical fibres, an optical receiver to detect an optical signal from the at least one of the two optical fibres to provide a signal profile, and a programmable computing device programmed to: (i) determine from the signal profile one or more air temperatures in the one or more air stream paths at a plurality of locations along the at least one of the two optical fibres, (ii) correlate said one or more air temperatures to monitor the operation of at least one of the plurality of rotating fans and the cooling provided to the corresponding segment of the plurality of process tubes, and (iii) evaluate at least one of the one or more air temperatures from at least one of the plurality of locations against one or more comparison operational conditions.

* * * * *